3 Sheets--Sheet 2.

R. CULBERTSON & A. EDGAR.
Grain-Binders.

No. 146,169.  Patented Jan. 6, 1874.

Attest:
S. H. Caplinger
R. Connett

Inventors:
Robert Culbertson
Alexander Edgar
by Henry Connett Jr.
Atty

3 Sheets--Sheet 3.
R. CULBERTSON & A. EDGAR.
Grain-Binders.
No. 146,169. Patented Jan. 6, 1874.
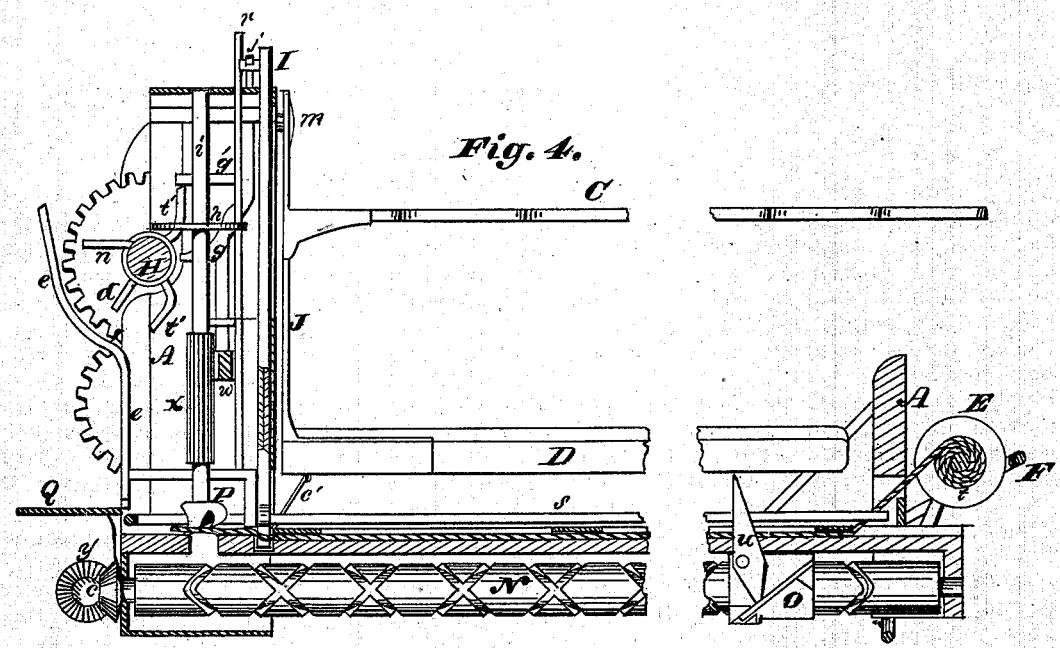
Fig. 4.
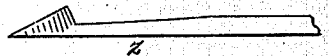
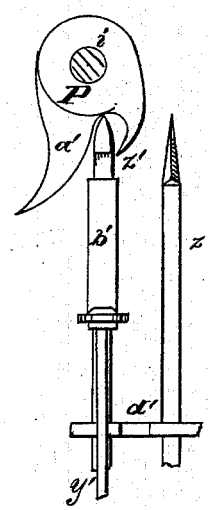
Fig. 5.    Fig. 6.
Attest:
S. H. Caplinger
R. Connett
Inventors:
Robert Culbertson
Alexander Edgar
by
Henry Connett Jr
Atty

UNITED STATES PATENT OFFICE.

ROBERT CULBERTSON, OF MOOREFIELD, AND ALEXANDER EDGAR, OF VEVAY, INDIANA.

IMPROVEMENT IN GRAIN-BINDERS.

Specification forming part of Letters Patent No. 146,169, dated January 6, 1874; application filed August 5, 1873.

*To all whom it may concern:*

Be it known that we, ROBERT CULBERTSON, of Moorefield, and ALEXANDER EDGAR, of Vevay, both in Switzerland county, in the State of Indiana, have invented certain Improvements in Raking and Binding Attachments for Harvesters, of which the following is a specification:

The object of our invention is to receive the grain from the cutter-bar, drop it, rake it into a sheaf, bind it with twine or cord, and deliver it on the ground out of the way—all this to be accomplished automatically, without the intervention of hand labor.

Figure 1:
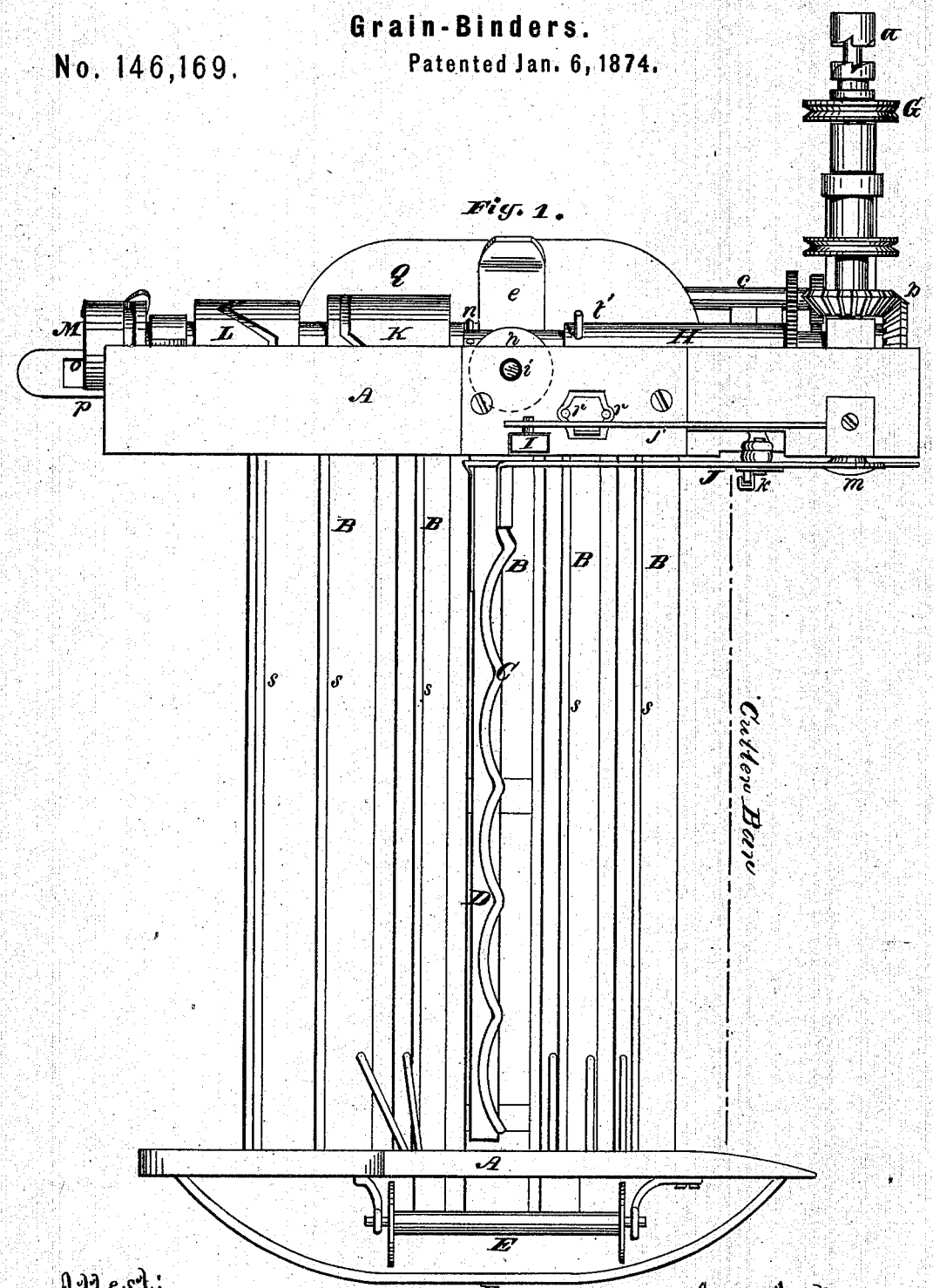
Figure 2:
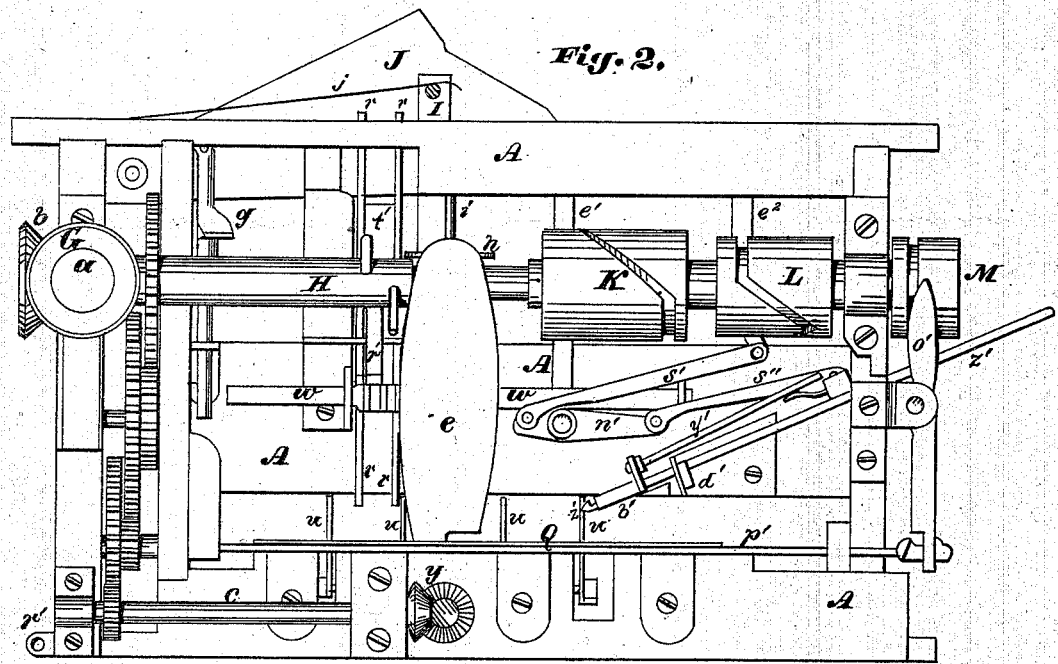
Figure 3:
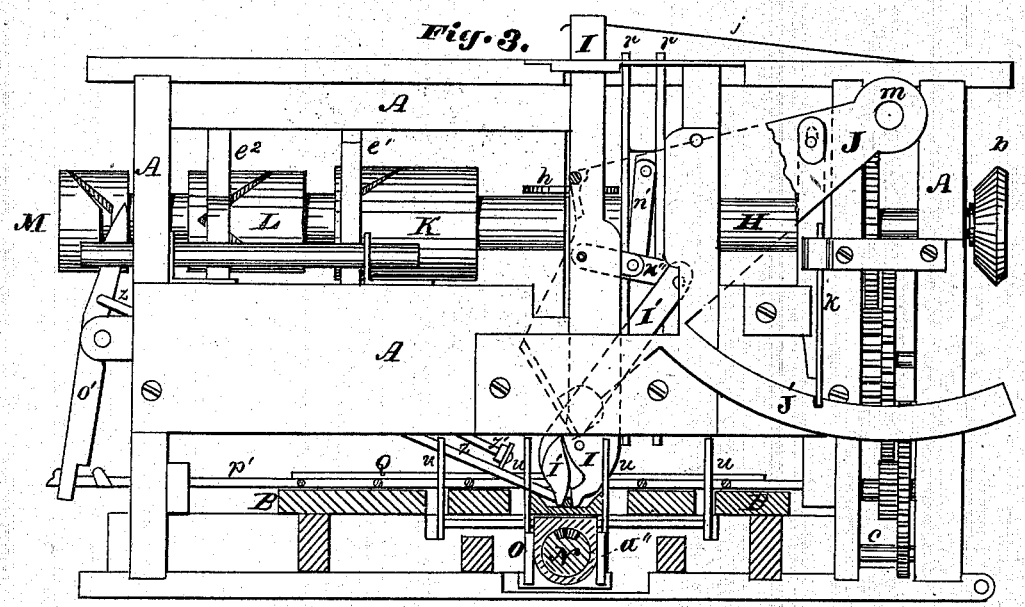

Figure 1 is a plan of our invention. Fig. 2 is an end view of the same. Fig. 3 is a sectional end view. Fig. 4 is a longitudinal vertical mid-section. Fig. 5 is a view of the knotting device, enlarged. Fig. 6 is a side view of the lance, enlarged.

Our attachment is affixed to the harvester immediately behind the cutter-bar, the position of which is designated by a broken line, and by name, in Fig. 1, and although the said cutter-bar and the reel form no part of our invention, the same frame-work may answer for the support of all. Our raking-platform is located, in regard to the cutter-bar, in substantially the same place as the raking-platform usually attached to harvesters.

In the drawings, let A A represent the frame-work for the support of the mechanism, and B B the slats forming the platform. A sheave, G, derives its motion from the ground-wheels of the harvester and communicates it to the dropping, raking, and binding mechanisms through the medium of the miter-wheels $b$, and the various spur-wheels and pinions shown. The dropping device consists of an arm J, pivoted to the frame-work at $m$. This arm is furnished with a scalloped dropper-bar, C, projecting parallel with the cutter-bar, and a circular segment, J'. The dropper is operated from the main shaft H. A pin, $d$, projecting from the said shaft, engages with a toe, $g$, on a catch-bar, $k$, which lifts the said bar vertically in its bearings as the shaft revolves. A pin on the upper end of the catch-bar engages with a slotted opening in the arm J. The lower extremity of the catch-bar $k$ engages with a notch in the segment J', and acts as a detent or stop to the dropper. By reason of the slotted opening in the arm J, the bar $k$ is lifted free of the notch in the segment J' before any lifting-pressure is brought to bear upon the arm J, as we have clearly shown in Fig. 3. In this figure we have shown a portion of the arm J in dotted lines, to avoid obscuring important features in the drawing. A bar, D, secured to the arm J and projecting parallel to the dropper-bar C, serves to keep the cut grain down evenly on the platform while it is being raked.

Operating in connection with the dropper is a device for clearing the butts of the cut grain from the cutter-bar. A series of rods, $s\ s$, properly spaced, extend longitudinally over the platform and rest thereon parallel to the cutter-bar. These rods are attached at the forward end rigidly to a sliding bar, $p'$, which plays endwise in guide-holes in the frame-work, and receives an intermittent reciprocatory motion from the grooved cam M, through the medium of a cam-rod, $o'$. The grain falls on the grating formed by the rods $s\ s$, and at that instant sufficient lateral motion is imparted by the cam M to the said grating to clear the grain from the knives, where it remains stationary until the grain is raked off, and then returns to its former position.

Acting in conjunction with the dropping device just described, and timed properly therewith, is the raking device. A shaft, $c$, bearing a pinion on one end and a miter-wheel on the other, receives motion through a train of gears, (see Fig. 2,) and communicates said motion, through the miter-gears $y$, to a screw, N, resting in bearings under the center slat of the platform, parallel to the cutter-bar. This screw is peculiarly constructed, having endless right-and-left-handed thread, with a steep pitch. A nut, O, provided with a rod bearing two or more rake-teeth, $u\ u$, traverses this screw back and forth, and forms the rake-head. A continuous rotary motion of the screw N causes a reciprocatory motion of the said rake-head. The rake-teeth project upward between the slats of the platform B B when advancing and raking the grain, but turn down so as to lie horizontally below the surface of the platform when retreating. To accomplish this, the nut O has a leaf-spring, $a''$, attached to each side, and the lower ends of the two rake-teeth adjoining the nut are angular, as shown, and press against the said spring in the manner of a penknife-blade. Stops or trippers (not shown) are placed at the opposite ends of the platform, so that the teeth, which are all rigidly attached to the same rod, are simultaneously thrown down to a horizontal position at the inner end of the platform before retreating, and again raised to a vertical position at the outer end of the platform before returning. The binding device operates in connection with the dropping and raking devices, and is properly timed therewith. The main shaft H is provided with suitable lifters $t'$ $t'$, which operate consecutively on toes or trippers $r'$ $r''$, attached to a slider, $r$ $r$. This slider is connected, by means of a system of toggle-levers, $n'$ $n''$, with two jaws, I I', of a device we denominate "tongs." One jaw, I, of the tongs plays vertically in guides, and is provided with a pressure-spring, $j$, at the top. The loose jaw, I', is pivoted to the fast jaw, I. By an examination of Fig. 3, it will be seen that an upward motion of the slider $r$ $r$ operates first to close the jaws of the tongs, and then to lift them upward. Beyond the outer end of the platform is hung a spool or reel of twine, E, from which the end of the twine is led along a groove in the central slat B, (see Fig. 4,) under suitable cleats, to and between the jaws of the above-mentioned tongs, as shown.

We will now give the operation of the mechanism, so far as we have described it. After the dropper has received its charge of grain, it rises and lets the load fall upon the rods $s$ $s$, which immediately move back so as to clear the butts from the knives. The dropper instantly falls, to receive another charge. The bar D now rests on or over the grain on the platform, and keeps it in place. The rake-teeth, being now erect at the outer end of the platform, begin to move inward and forward the grain, and simultaneously the tongs clasp the twine and rise. The cleat over the groove and twine immediately in front of the tongs keeps the twine down at that point, and the grain is pushed by the rake against the bight of the twine between this point and where the tongs clasp it, said twine "paying" off the reel E as it is needed. As the rake advances, the sheaf, encircled by the twine, is pushed out upon the table Q. At this moment, just as the rake starts back, the tongs fall again to their former position, carrying with them a guard-plate, $e$, attached rigidly thereto. This guard-plate falls upon the double strand of twine between the sheaf and the rake, thus separating said sheaf from the knotting or tying mechanism, which we will now describe.

On the main shaft H is a grooved cam, K, which gives an intermittent longitudinal movement to a horizontal rack, $w$. Through the medium of a cam-rod, $e^1$, meshing with this rack, is a long pinion, $x$, on a vertical shaft, $i$. This shaft has a certain amount of vertical movement endwise in its bearings, and is raised and dropped at the proper time by means of a lifter, $n$, on the main shaft H, operating against a disk, $h$, on the shaft $i$. The shaft $i$ has an intermittent rotary motion, which renders a disk necessary in this place. Secured to the lower extremity of the shaft $i$ is a hook, P, of a peculiar shape, which we call a "knotter." This knotter rises with the tongs by reason of the bar connecting the guard-plate $e$ with the tongs acting as a lower bearing for the shaft $i$. The lifting of the knotter is necessary to permit the sheaf to pass under, but it drops with the tongs and rests upon the double strand of twine immediately beneath it. It then begins to turn to the right, rising slightly at the same time. As it begins to revolve the long point $a'$ of the hook on the knotter passes under the double strand of twine. The knotter makes one revolution in rising, and then drops, having twisted a loop in the twine to form a knot. At this moment comes in play a device for cutting off the end of the twine and drawing it through the loop to complete the knot. A grooved cam, L, operating on a cam-rod, $e^2$, gives intermittent motion to a series of levers, $s'$ $s''$ $n'$, and from them to a lance, $z$, and hook $z^1$, parallel to each other, and secured together. These have a common bearing in the frame-work, and another at $d'$, and move obliquely downward at the moment the knotter drops, the lance $z$ cutting off the twine between the knotter and the tongs, and the hook $z'$ simultaneously passing through the loop formed by the knotter P and engaging the end of the twine cut off. The hook $z'$ passes through a sleeve, $v'$, attached to a rod, $y'$. This rod connects the sleeve with the lever $s''$ through the medium of a short horizontal lever, (not shown,) having bearings in a suitable provision attached to the hook $z'$ and lance $z$. The duty of this sleeve is to slip down and lock fast the end of the severed twine in the barb of the hook, after the latter has caught it, and this movement is obtained by the combined action of the levers operating the hook and lance. On the return of the hook to its first position the severed end of the twine is drawn through the loop, the twine slipped from the knotter, and the knot drawn tight.

The expansion of the tightly-compressed sheaf fills up the surplus portion of the band between the tying mechanism and the guard-plate $e$, and the last sheaf bound pushes the preceding one from the table Q. After the knot is tied, and while the next sheaf is forming, the knotter P rotates once around backward.

F is a guard or fender, to protect the reel E, and $c'$ is a hinged flap to prevent the cut grain from getting between the arm J and the tongs.

The object we have in making the dropper-bar C in scallops or segments of circles, with their concave faces toward the cutter-bar, is to prevent the leaning grain from falling to either side, as it is liable to do when said bar is made straight.

We claim—

1. In a raking and binding device, the floating carrier or grating, consisting of the rods $s\ s$, and sliding bar $p'$, constructed and arranged to operate substantially in the manner and for the purposes specified.

2. The jaws I I', toggle-levers $n'\ n''$, spring $i$, slider $r\ r$, trippers $r'\ r'$, and shaft H, operating together to form tongs for grasping the binding-twine, substantially as shown, and for the purposes set forth.

3. In combination with the elements forming the twine-grasping device, the guard-plate $e$ attached thereto and operating in the manner specified.

4. The knotting or tying device, consisting of the knotter P, shaft $i$, disk $h$, pinion $x$, rack $w$, lifter $n$, and cam K, arranged to operate substantially as shown.

5. The device for cutting the twine and drawing the end through the loop, consisting of the lance $z$, hook $z'$, sleeve $b'$, rod $y'$, levers $s'\ s''\ n'$, cam-rod $e^2$, and cam L, or their equivalents, combined and arranged substantially as shown and for the purposes specified.

Witness our hands this 29th day of July, 1873.

ROBERT CULBERTSON.
ALEXANDER EDGAR.

Witnesses:
HENRY CONNETT, Jr.,
D. E. MILLER.